United States Patent [19]

Green

[11] 3,860,193
[45] Jan. 14, 1975

[54] SELF LOADING REEL CARRIER
[75] Inventor: Lane A. Green, Longview, Tex.
[73] Assignee: Superior Iron Works & Supply Company, Inc., Shreveport, La.
[22] Filed: Sept. 24, 1973
[21] Appl. No.: 400,267

[52] U.S. Cl. .......................... 242/86.5 R, 214/390
[51] Int. Cl. .......................................... B65h 75/40
[58] Field of Search ........ 242/86.5 R, 58.6; 214/390

[56] References Cited
UNITED STATES PATENTS

| | | | |
|---|---|---|---|
| 1,864,676 | 6/1932 | Smith | 242/86.5 R |
| 2,616,636 | 11/1952 | Aden | 242/86.5 R |
| 2,913,194 | 11/1959 | Garnett | 242/86.5 R |
| 3,690,491 | 9/1972 | Butler | 214/390 |

Primary Examiner—John W. Huckert
Assistant Examiner—Edward J. McCarthy
Attorney, Agent, or Firm—Hubbard, Thurman, Turner & Tucker

[57] ABSTRACT

A self loading reel carrier is disclosed. A U-shaped main frame member is carried on a wheel assembly having a longitudinally extending drawbar pivotally secured to the main frame. A single hydraulic cylinder is pivotally mounted to the drawbar and main frame so that extension of the cylinder will tilt the main frame rearwardly to a reel loading or unloading position. The pivotal attachment of the cylinder affords a mechanical advantage and impact forces when loading are imposed only in tension on the cylinder. The reel is carried on a transverse spindle shaft engaging slots in reel supporting brackets at opposite side of the main frame. The spindle receiving slots are open so the carrier can be backed into engagement with reels of various diameter when rearwardly tilted.

11 Claims, 6 Drawing Figures

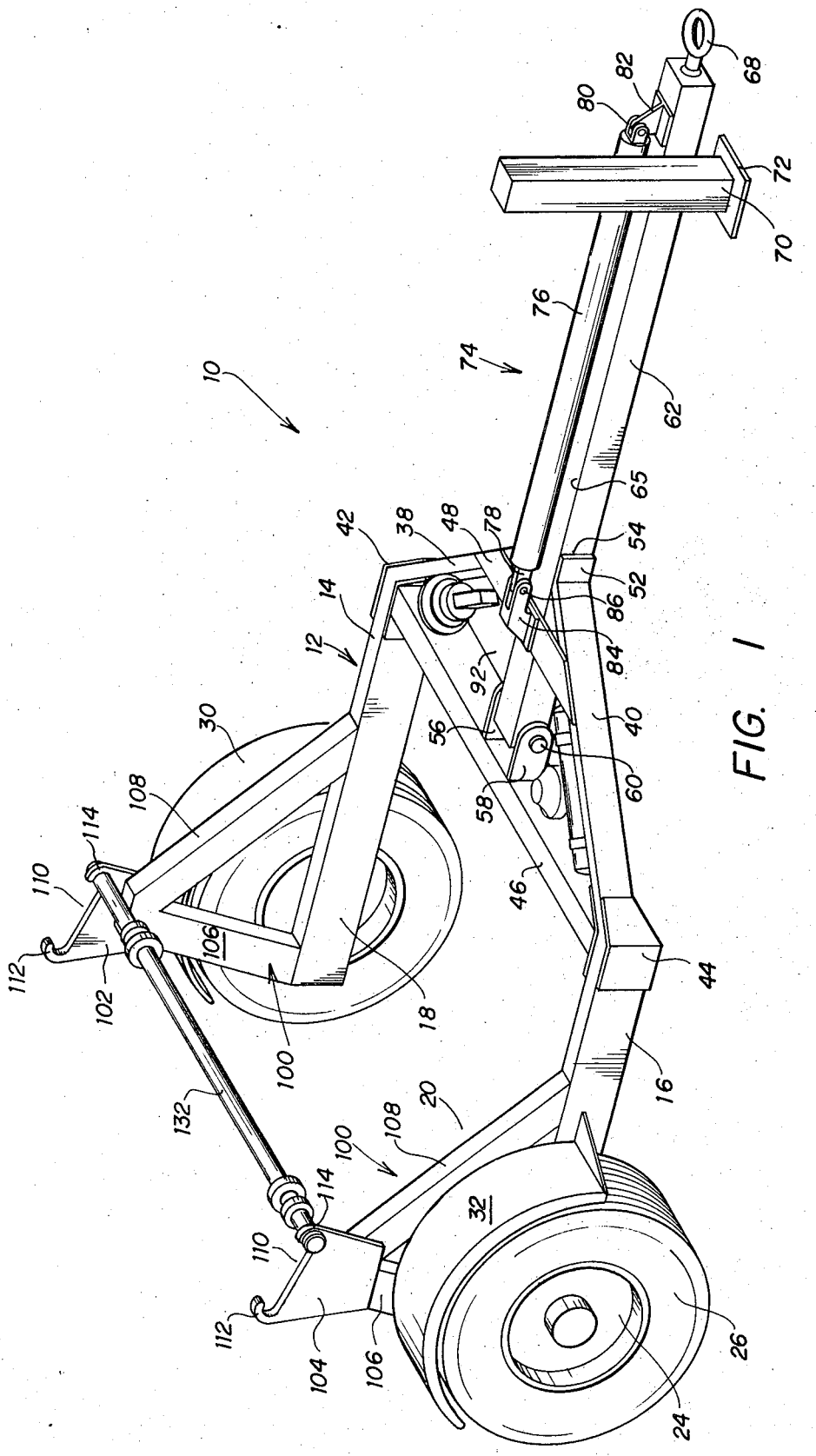

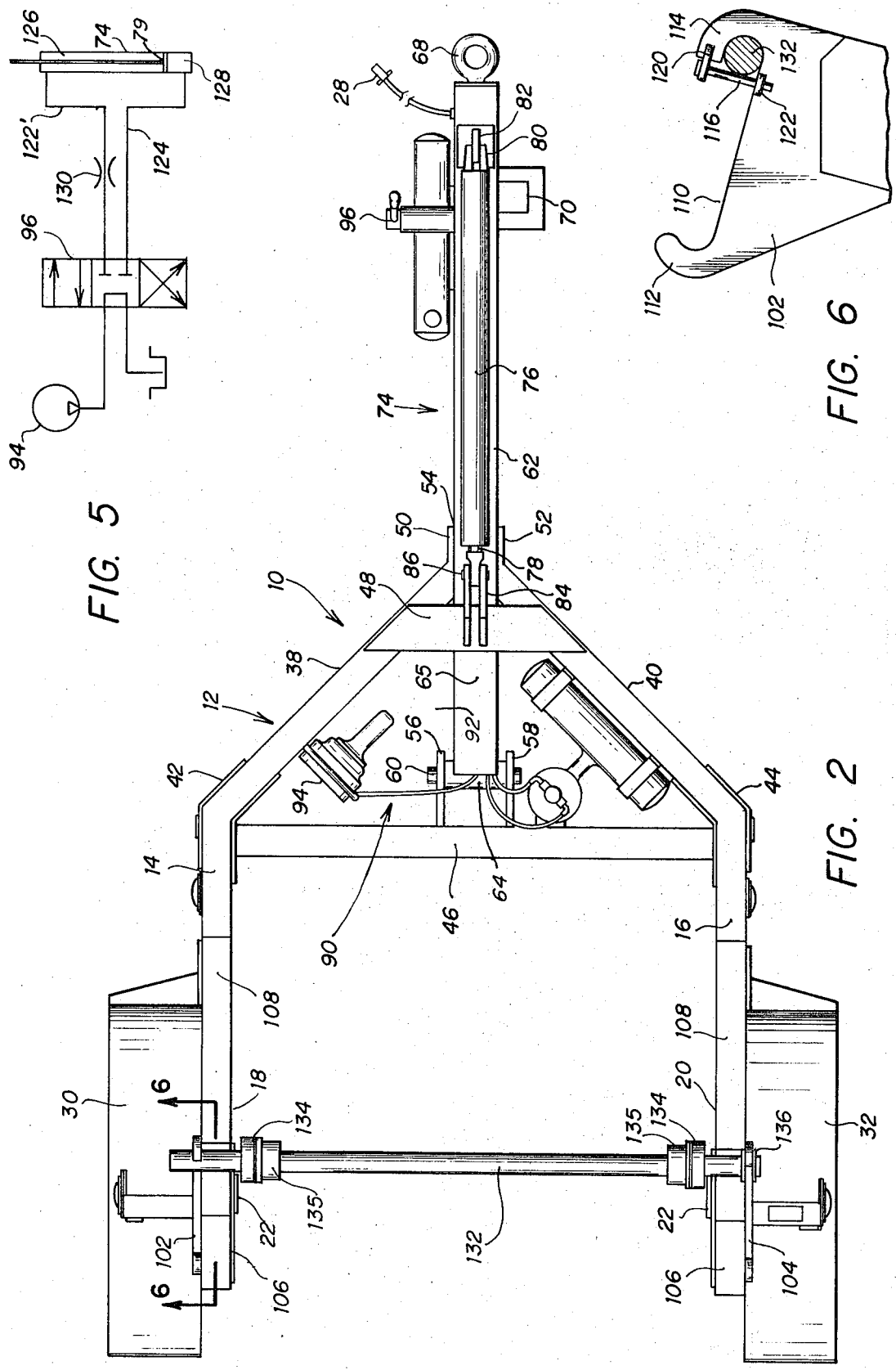

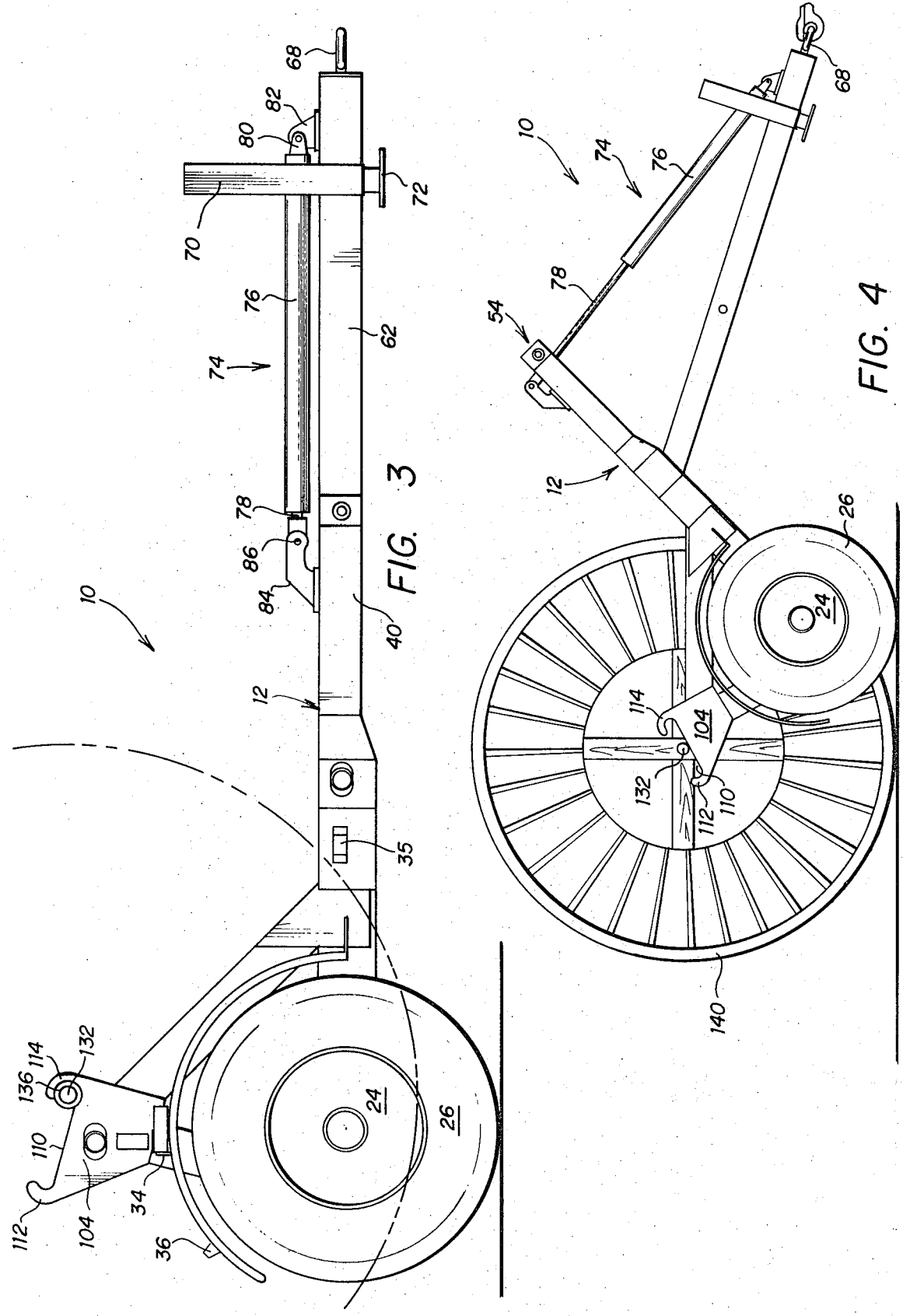

SELF LOADING REEL CARRIER

This invention relates to trailers and more particularly, relates to mobile trailers for the loading, unloading and transportation of reels of cable such as electrical transmission and telephone cable. The invention is generally referred to as a reel carrier.

Cable, wire rope, electrical transmission lines and the like are generally stored on large reels having flanged spools around which the cable is wrapped. These spools are generally quite large and heavy. Where it is necessary to install the cable, the reel is rotatively mounted on a spindle shaft at the construction site or a cable stringing or tensioning device such as that shown in co-pending application, Ser. No. 398,828 entitled CABLE STRINGING APPARATUS, filed Sept. 20, 1973.

To transport the large cable reels to the field, a reel supporting carrier is adapted to support the reel. A number of reel carrier devices can be found in the prior art. Generally, these devices are either platform mounted adapted to be placed on the bed of a truck for the purpose of facilitating the transportation of the cable reels or the carriers may be mounted on a wheel assembly or trailer for mobility. Generally, the prior wheeled trailers have a vertically movable frame member which receives and holds the ends of the reel spindle shaft and which may be lowered to receive this shaft for loading and unloading. Once the reel supporting shaft is set in position, it is raised by one or more appropriately arranged hydraulic jacks. Typical of devices of this type are the trailer shown in U.S. Pat. Nos. 3,000,587 and 3,379,392.

Other prior apparatus for handling and transporting reels include a projecting boom or pair of arms rotatively mounted on the frame for swinging movement in a generally vertical plane. The boom or arms can be lowered by means of a suitable pair of hydraulic cylinders to a position so that a reel may be picked up. Once the reel is engaged in the arms, a hydraulic system is actuated to pivot the boom or lifting arms so that the reel is elevated to a position for transportation of the reel.

These prior art reel handling devices are generally able to pick up and transport large cable reels. However, these devices generally involve rather complex linkages for operating the cable reel lifting mechanism. Further, the lifting mechanism often utilizes several hydraulic cylinders usually paired operating at opposite sides of the trailer. Such construction adds to the cost and complexity of the apparatus. The size and weight of the reels require hydraulic cylinders for handling the reels be of substantial size. Further, many of the prior art reel carriers do not comply with current industrial safety requirements and standards.

The present invention provides a reel handling and transporting device for handling comparatively large and heavy reels of cable. The unit includes a main frame or chassis which is generally U-shaped and open at the rear. The frame work is supported on an appropriate wheel and axle assembly. An axially extending tongue is pivotally attached to the front of the U-shaped frame. A hydraulic cylinder is mounted with the rod end pivotally secured to the main frame and the housing end secured by a clevis to the tongue. A pair of reel spindle supports oppositely extend from the main chasis. Each of the reel support plates is provided with an elongated slot for engaging the ends of the spindle. Upon extension of the hydraulic cylinder, the main frame pivots rearwardly to cause the reel support plates to rotate to a lower loading position. The trailer may then be backed into engagement with the reel spindle shaft. The hydraulic cylinder is then retracted causing the main frame to return to its normal horizontal position with the end of the reel spindle engaged in the slot at the opposite reel supporting die plates.

Other objects and advantages of the present invention will become apparent from the following description taken in conjunction with the accompanying drawings, wherein:

FIG. 1 is a perspective view of a reel carrier construction in accordance with the present invention having a cable reel mounted in position for transportation;

FIG. 2 is a top view of the reel carrier of the present invention;

FIG. 3 is a side view of the reel carrier of the present invention;

FIG. 4 is a side elevational view of the reel carrier of the present invention with the frame being pivoted to a loading position;

FIG. 5 is a schematic diagram of the hydraulic system for operating the carrier; and FIG. 6 is a detail view of the reel carrier spindle support bracket.

Referring now to the drawings, the reel carrier of the present invention is generally designated by the numeral 10 and comprises a horizontal U-shaped framework open at the rear end to receive the cable reel. The frame 12 includes opposite parallel side members 14 and 16 which may be of any suitable structural shape such as the box channels shown. The side members 14 and 16 are supported on opposite assemblies 18 and 20. Wheel assemblies 18 and 20 each include a stub axle 22 suitably secured to the adjacent side reel. Preferably, the wheels are mounted on stub axle 22 such as shown rather than an axle which extends transversely across the frame so that the space between the side rails remains open and unobstructed. A conventional steel wheel 24 and pneumatic tire 26 are carried on the axle 22. It will be obvious to those skilled in the art to include some type of spring suspension between the frame members and the axle 22 to provide a smoother ride. For example, the axles 22 can be attached to a suitable leaf spring by a clevis and plate with the opposite ends of the leaf spring attached in conventional manner to the underside of the side members 14 and 16. An appropriate hydraulic brake drum and braking device may be also associated with wheels 24 in a conventional manner. A semi-circular fender 30 and 32 is secured to the side rails 14 and 16 to shield the wheels. Appropriate travel lights 34 and signal lights 36 are secured to the top of the fenders. The travel and signal lights are connected to the electrical system of the towing vehicle by electrical connector 28. Running lights 35 may be provided on the opposite side rails 14 and 16.

Frame 12 further includes forwardly converging side rails 38 and 40 which are respectively welded side members 14 and 16 and form a general "A" frame. Suitable reinforcing plates 42 and 44 may be welded to the connection between the side members and side rails. Transversely extending cross member 46 connects the forward ends of side members 14 and 16. A plate 48 extends across the top of converging members 38 and 40. Note that members 38 and 40 are not connected at their forward ends but terminate at longitudinally extending plates 50 and 52 which connect the forward ends of rails 30 and 40 to the transverse plate 48. Thus, a longitudinal clearance opening 54 is provided at the forward end of the A frame rail members. Bracket plates 56 and 58 extend forwardly from cross member 46 at opposite sides of the longitudinal centerline of the unit. A pivot pin 60 extends between bracket plates 56 and 58.

The rear end of axially extending tongue or drawbar 62 is provided with journal member 64 which is pivotally mounted about pivot pin 60. Drawbar 62 is shown as a suitable box channel having a flat upper surface 65. In the normal horizontal position, drawbar 62 axially extends longitudinally through opening 54 between the plate 50 and 52. The upper surface 65 of the drawbar 62 is engaged by underside of cross member 48 so that the frame 12 and the drawbar will not forwardly pivot beyond a horizontal position.

The front of the towbar or drawbar 62 carries a conventional towing eye 68. A front jack 70 is secured to the towbar 62 having extendible ground engaging members 72 which may be used to balance and stabilize the carrier 10 during loading or unloading or during winding or unwinding of cable from a reel carried on the reel carrier.

Linear hydraulic cylinder 74 is aligned on the longitudinal axis of the carrier and has a housing 76 and an extensible rod 78 connected to reciprocate piston 79. The blind end of the housing carries a clevis 80 which is pivotally secured to bracket 82 welded to the upperside 65 of the drawbar 62 near the forward end of the drawbar. Cylinder rod 78 is pivotally connected to clevis 84 at pivot pin 86. Clevis 84 is secured to the upper side of cross member 48.

A suitable hydraulic power package 90 is mounted to a platform 92 which is attached by welding to the side rails 38 and 40. Hydraulic power package 90 includes a hydraulic pump 94 powered by a DC electric motor which derives its power from electrical connection 28. A four-way control valve 96 controls the flow of hydraulic fluid to and from the hydraulic cylinder 74 is also included with the power package 90. The hydraulic system will be described in greater detail with reference to FIG. 5.

The reel supporting structure 100 is best seen in FIGS. 2, 3 and 6 and includes opposite bearing plates 102 and 104, each supported above axles 22 on vertical post member 106. A diagonal brace 108 extends from each of the reel supporting plates 102 and 104 and is welded to side members 14 and 16 for structural support. Plates 102 and 104 each carry slot 110 which, in the normal transporting position of the carrier, is forwardly inclined. Slot 110 is closed at opposite ends by semi-circular ears or stops 112 and 114. As seen in FIG. 6, locking pins 116 may be associated with the forward stop 114 received in oppositely aligned sockets 120 and 122 carried on the inside of the reel support plates so that pin 116 extends across the slot 110 at ear 114.

Spindle shaft 132 extends transversely between the opposite reel support plates 102 and 104. The spindle shaft carries a pair of axially adjustable collars 134 and an arbor assembly 135 for engaging the center hub of the reel drum. The outer end of the spindle shaft 120 may carry annular locking rings 136 which fit on opposite sides of the bracket plate 102 and 104 to prevent transverse shaft movement.

FIG. 5 shows a schematic of the hydraulic circuit which operatively controls the positioning of the reel carrier of the present invention. Hydraulic pump 94 is connected to four-way control valve 96. Control valve 96 is mounted on the platform 92 and connected by lines 122' and 124 to the opposite cylinder chambers 126 and 128 of linear hydraulic actuator 74. A restriction or orifice 130 in line 122 leading to the rod end chamber 126 serves to prevent too rapid actuation of the device and serves to retard the speed of operation of the hydraulic cylinder. Orifice 130 may be in the form of an orifice plate integral in the port of chamber 126. If control valve 96 is moved downwardly, pressure fluid from pump 94 is directed across valve 96 and line 124 to cylinder chamber 128. Pressurization of cylinder chamber 128 will cause an extension of cylinder rod 78. Extension of cylinder rod 78 will cause the chassis 12 to pivot to the reel loading position acting through a lever arm the distance between the centers of pivots 60 and 86. Reverse actuation of valve 96 will direct pressure fluid to the opposite cylinder chamber 126 causing the retraction of the piston rod 78 returning the chassis to the horizontal transporting position. Restriction 130 in line 132 serves to dampen and retard the speed of operation of the hydraulic cylinder in both directions of operation. The dampened or controlled speed of operation prevents damage to the reel carrier or a reel. This is particularly true in the case of unloading a heavy reel from the apparatus. The added weight of the reel, once the reel spindle is moved beyond the vertical plane through the axles, will tend to extend the cylinder rod 78 at a rapid rate.

The reel carrier 10 of the present invention will be more fully understood from the following description of operation. If it is desired to transport a reel 140 from a storage location to a construction site, reel trailer 10 of the present invention is connected to a suitable towing vehicle at eye 68. The quick connect connector 28 is plugged into the electrical system of the towing vehicle to provide the power for the hydraulic power package 90 and energy for the trailer lighting system. Spindle shaft 132 is inserted through the central cross bore in the hub of cable reel 140. The arbor and locking collars 134 and 135 are engaged on the spindle shaft 132 at opposite sides of the reel and secured. The reel is now ready to be loaded on the reel carrier 10.

Hydraulic valve 94 is actuated to a position to direct pressure fluid to line 124 to cylinder chamber 128. Pressurization of cylinder chamber 128 will cause extension of cylinder rod 78 which, in turn, will cause main frame 12 to pivot about pivot pin 60 and cause the frame to tilt rearwardly about the wheels 24. Bracket plates 102 and 104 will be lowered to a position with slots 110 assuming a near vertical position. Note that wheels 24 assist in the pivoting of the main carrier chasis 12 to the loading position, the wheels rolling forwardly as the carrier tilts rearwardly. Once the cylinder rod 78 is fully extended, the towing vehicle may be backed up with the slots 110 and opposite bracket plates 102 and 104 in alignment with the ends of the spindle shaft 132. The towing vehicle is backed until the spindle shaft 132 strikes or engages slot 110. The force exerted on the cylinder when the carrier strikes the reel spindle is in tension since the pivot 86 moves about the drawbar pivot 60. Note that slot 110 is of sufficient length so as to accommodate reel of varying diameters. For example, a reel of smaller diameter would carry the spindle shaft at a position so that the spindle would strike slot 110 at a location closer to stop 112. Once the ends of the spindle shaft are received in slot 110, hydraulic valve 94 is actuated to the opposite position to cause pressure fluid to be delivered to cylinder chamber 126. Pressurization of cylinder chamber 126 will cause retraction of the cylinder rod and will pivot the chasis 12 back to return to its normal horizontal position. In the horizontal position, the underside of plate 48 engages the top drawbar 62 to limit the pivotal travel of the frame. Thus, the drawbar and frame connect in the form of a general knee joint with motion permitted in only a single pivotal direction.

As the frame is returned to its upright position, spindle shaft 132 will, due to the weight of the reel, roll along slot 110 until the shaft comes to rest against the forward semi-circular retainer 114. Note that this position is slightly ahead of the vertical centerline of axle shafts 22. Locking rings 136 limit the transverse shifting of spindle 122 during transportation of the reel. Locking pin 116 can be dropped into place in its sockets 120 and 122 to further retain the spindle 132 in place.

When the reel is transported to the desired location, the reel can be lowered by simply removing the locking pins 116 and again actuating hydraulic valve 94 to cause extension of hydraulic cylinder 74 to tilt the main frame 12 rearwardly to a reel unloading position. The towing vehicle is then driven forwardly to disengage the reel carrier from the reel.

The reel carrier 10 of the present invention may also be used as a payout device with the cable on the reel 140 being paid out directly from the reel carrier. If the carrier of the present invention is to be extensively used for direct payout of cable, a suitable journal bearing assembly may be associated with the spindle shaft 132 and locked to the opposite bracket plates 102 and 104. Also, an appropriate braking device can be mounted on the carrier to brake and control the rotation of the spindle to regulate the tension of cable as it is paid out.

From the foregoing, it will be obvious that the cable reel carrier of the present invention provides a simple, rugged and highly efficient device. The reel carrier is pivotally pivoted by virtue of the knee action pivotal connection from the transporting to the reel loading or unloading positions. The positioning of the carrier is readily achieved by a single hydraulic cylinder, rather than several as required by many prior art devices. The simple spindle supporting the device can accommodate reels of various sizes with no adjustments being necessary. It is to be noted that the knee action pivotal connection also places the hydraulic cylinder only in tension rather than compression which substantially reduces the possibility of damage to the hydraulic cylinder. The hydraulic cylinder is not required to be substantially sized because of the mechanical advantage achieved through the use of the pivotal knee action connection of the present invention.

Although the preferred embodiment of this invention has been illustrated and described, it will be understood that other changes, modifications and alterations may be made without departing from the spirit and scope of the present invention.

What is claimed is:

1. A carrier for a spindle mounted reel comprising: a main frame having two opposite side members and a rear opening for receiving a reel;
wheel assembly means supporting said main frame;
reel spindle supporting means carried on said frame adapted to engage a spindle disposed in the opening;
a longitudinally extending drawbar pivotally connected to said main frame member; and
means for pivoting said main frame relatively to said drawbar whereby said reel supporting means can be selectively rotated between a loading and unloading position and a transporting position, said means for pivoting said main frame comprising a linear hydraulic cylinder pivotally attached to said drawbar and to said main frame at a location on the main frame ahead of the connection between the drawbar and main frame.

2. A carrier for a spindle mounted reel comprising:
a main frame having opposite parallel side members and a transverse crossbeam arranged in a general U-shape having an open rear, said frame carried on a pair of wheel means rotating about a common axis,
forwardly converging side rail secured to said side member defining a longitudinal opening at their forward ends;
a pivot plate carried on said main frame;
spaced apart reel supporting means on said opposite frame side member, said reel supporting means including oppositely disposed bracket plates defining slots therein for reception of the spindle;
a drawbar extending through said opening and secured to said main frame at said pivot;
a hydraulic cylinder having a housing and extensible rod members, one of said members being pivotally attached to said drawbar and the other to said main frame at a location on the main frame ahead of the connection between the drawbar and main frame whereby said cylinder is extensible to pivot said frame relative to said drawbar between a transporting and a reel loading and unloading position.

3. The carrier of claim 2 wherein said slots in said bracket plates are elongated having generally stops at either end and adapted to be moved to a substantially vertical orientation in the reel loading and unloading position.

4. The carrier of claim 3 wherein said slots are inclined forwardly and downwardly in said transporting position, the forward ends of the slots being positioned forward of the axis of rotation of the support wheels.

5. The carrier of claim 3 including a carrier mounted hydraulic power package operatively connected to said cylinder.

6. The carrier of claim 3 wherein said power package is adapted to connecting to a towing vehicle by releasable electrical connection.

7. A carrier for a spindle mounted reel comprising:
a wheeled frame member;
a drawbar pivotally connected to said frame member, said drawbar and frame forming a knee joint with the frame adapted to pivot from a generally horizontal transporting position to a rearwardly tilted reel loading and unloading position;
reel supporting means on said main frame; and
actuation means operatively connected to said frame and drawbar and adapted to pivot said frame to said position, the connections of said actuation means to said frame and drawbar being such that the actuation means is placed in tension during actuation and a mechanical advantage is obtained.

8. A carrier for a spindle mounted reel comprising:
a frame member carried on said wheel;
a drawbar connected to said frame member at a pivot connection located adjacent substantially at one end of said drawbar and at an intermediate position along the frame member, said drawbar longitudinally extending forwardly and forming a knee joint with the frame so that the frame is adapted to tilt upwardly and rearwardly about said pivot and said wheels from a generally horizontal transporting position to a reel loading and unloading position;
reel supporting means on said main frame, said reel supporting means defining opposite open means adapted to carry said spindle and arranged to receive said reel spindle in said tilted position; and hydraulic means operatively connected to said frame and drawbar and adapted to tilt said frame to said reel loading and unloading positions whereby said carrier is adapted to back into a position with the slots engaging said spindle and wherein impact forces are imposed on said cylinder as tension forces.

9. A carrier for a spindle mounted reel comprising:
a frame having wheels at an intermediate location;
a drawbar forwardly extending from said frame and pivotally connected to said frame at a pivot shaft ahead of said wheels;
reel spindle engaging means carried on said frame;
a hydraulic cylinder having a housing and rod members; one of said members being pivotally connected to said drawbar and the other member pivotally connected to said frame ahead of said pivot shaft whereby actuation of said cylinder will tilt said frame rearwardly through an effective lever arm from a horizontal to a tilted reel loading and unloading position.

10. The carrier of claim 7 wherein said actuation means is pivotally attached to said drawbar and to said frame at a location on the frame ahead of the connection between the drawbar and the frame.

11. The carrier of claim 10 wherein said drawbar and frame are pivotally connected at a location substantially adjacent one end of said drawbar and intermediate of said frame.

* * * * *